April 7, 1959  C. A. KILVERT  2,880,687
AIR STABILIZER RELEASE MECHANISM
Filed June 21, 1955  2 Sheets-Sheet 1
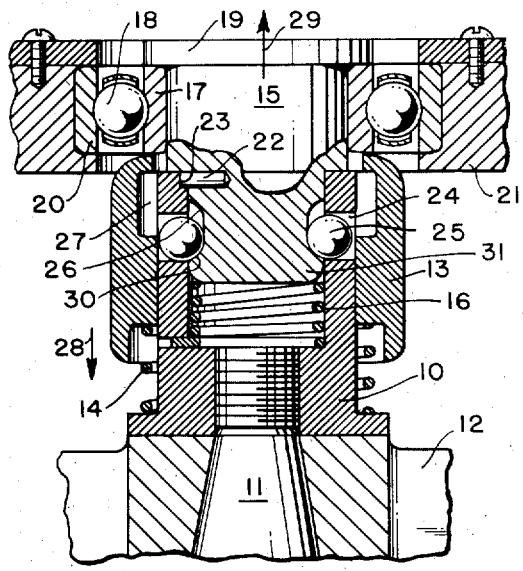
Fig. 1.
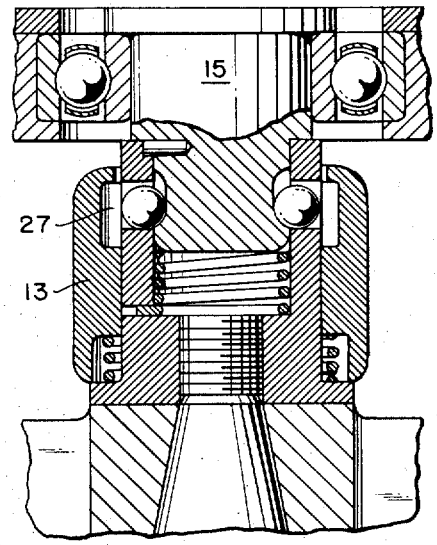
Fig. 2.
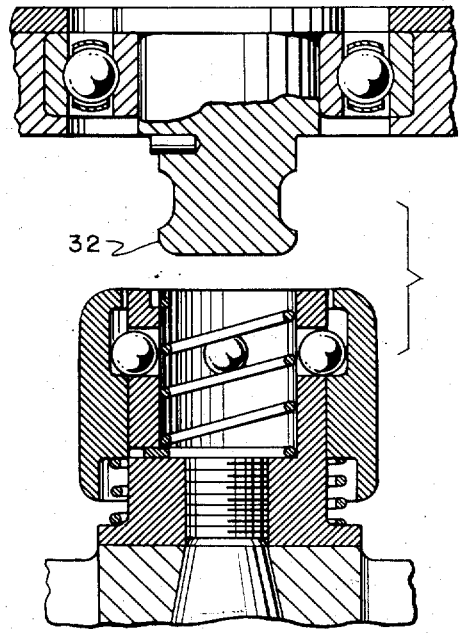
Fig. 4.
Fig. 3.
INVENTOR.
CHARLES ALEXANDER KILVERT
BY
ATTORNEYS April 7, 1959    C. A. KILVERT    2,880,687
AIR STABILIZER RELEASE MECHANISM
Filed June 21, 1955    2 Sheets-Sheet 2
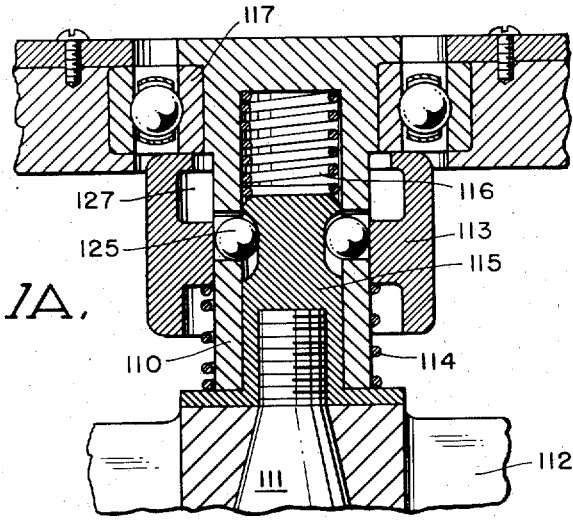
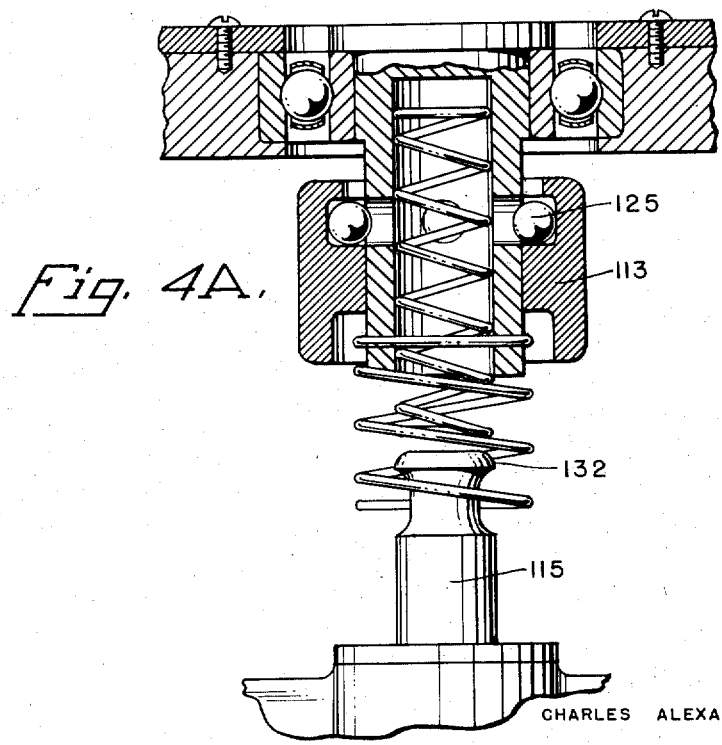
INVENTOR.
CHARLES ALEXANDER KILVERT
BY
ATTORNEYS

United States Patent Office 2,880,687
Patented Apr. 7, 1959

2,880,687

AIR STABILIZER RELEASE MECHANISM

Charles A. Kilvert, Providence, R.I., assignor, by mesne assignments, to the United States of America as represented by the Secretary of the Navy Application June 21, 1955, Serial No. 517,107

5 Claims. (Cl. 114—22)

This invention relates to aerial launched torpedoes and more particularly to devices for releasing an air stabilizer from a torpedo when the torpedo strikes the water.

It has become common practice to provide aerial launched torpedoes with air stabilizing devices which are separated from the torpedo when it strikes the water, one form being a parachute secured to the rear end of the torpedo which stabilizes its air trajectory and reduces the velocity of impact with the water. This has become essential to prevent damage to the delicate control devices of the torpedo as well as its principal structure. By the provision of such stabilizers, torpedoes may be constructed with less strength and weight of shells and other components, resulting in decreased cost. As will be apparent, premature release of such a parachute would permit the torpedo to fall without trajectory control and at a velocity which would render it useless upon water entry, whereas failure to release would produce such excessive drag that its water run would be ineffective. Such devices must, therefore, be as infalible as possible.

One of the objects of the invention is to provide an improved torpedo air stabilizer release mechanism.

Another object is to provide mechanism of the foregoing type which will not permit release of a parachute due to shock when the parachute opens or during subsequent fall of the torpedo and parachute to the water.

Still further objects, advantages and salient features will become more apparent from the description to follow, the appended claims, and the accompanying drawing, in which:

Fig. 1 is a longitudinal section through a torpedo propeller and propeller shaft, a parachute pack and a release device securing the parachute pack to the propeller shaft.

Fig. 2 is a section like Fig. 1 illustrating the position of parts when the torpedo strikes the water.

Fig. 3 is a section like Fig. 1 illustrating the position of parts during release of the parachute pack from the propeller shaft;

Fig. 4 is a section like Fig. 1 illustrating complete release of the parachute pack from the propeller shaft;

Fig. 1A is a section like Fig. 1 illustrating an alterative form of the invention; and Fig. 4A is a section like Fig. 4 of the alternative form of the invention.

Referring in detail to the drawing and particularly Figs. 1 to 4, the first form of the subject of the invention to be described comprises a tubular member 10, which threadedly engages propeller shaft 11, retaining propeller 12 on the shaft. A sleeve inertia weight 13 slideably surrounds member 10 and is urged to the position shown by a compression spring 14 which also surrounds member 10, one end abutting a flange on member 10 and the other end abutting the sleeve.

A plug-like member 15 is slideably disposed within the bore of member 10 and is urged in a direction outwardly of the bore by a compression spring 16 disposed within the bore. The inner race 17 of a deep groove ball bearing 18 is secured to member 15, a flange 19 preventing member 15 from separating from the inner race. The outer race 20 of the ball bearing is secured to a member 21 which forms a part of a parachute pack. A pin 22, press fitted in member 15, engages a notch 23 in member 10, preventing relative rotation between members 10, 15.

Member 10 is provided with four equiangularly spaced apertures 24 through its wall which slideably receive four balls 25, one in each aperture. Member 15 is provided with an annular groove 26 into which portions of the balls extend when the parts are locked together. Member 13 is provided with an annular groove 27 into which portions of the balls may move when unlocking of the parts occurs.

When a torpedo and attached parachute pack are launched from an aircraft they accelerate for a certain distance of fall and the parachute opens. Opening shock decelerates the torpedo and sleeve 13 tends to move forwardly in the direction of the trajectory as illustrated by arrow 28 against the urge of spring 14. It is prevented from doing so, however, since a rearward force, as indicated by arrow 29, is applied to member 15 tending to pull it rearwardly which applies forces on angular surfaces 30 which cams the balls radially outward into engagement with the inner surface of sleeve 13, applying a frictional force which prevents the sleeve from moving relative to member 10.

When the torpedo enters the water it decelerates and sleeve 13 moves to the position shown in Fig. 2 wherein the balls are now free to move outwardly into groove 27. Surfaces 30 now cam the balls outwardly by the rearward retarding force of the parachute and/or the urge of spring 16 on plug member 15, and, as shown in Fig. 3, the balls have been cammed out sufficiently to permit the lower portion 31 of member 15 to move by the balls. Fig. 4 illustrates complete release. The parachute now falls into the sea with member 15 and the parts attached thereto as shown in the upper portion of Fig. 4, and the torpedo continues on its dive and subsequent run with the parts shown in the lower portion of Fig. 4 attached to the propeller shaft. Radius 32 at the inner end of the plug member 15 permits a rolling egress of the plug member from the bore in event that the disengaging forces are not axially aligned.

Referring now to Figs. 1A and 4A, the alternative form of invention differs principally from that just described in that tubular member 110 is affixed to inner race 117, and plug member 115 is affixed to propeller shaft 111, rather than to propeller shaft 11 inner race 17, respectively, as in Figs. 1 to 4. The construction is otherwise the same as in Figs. 1 to 4, and sleeve inertia weight 113, spring 114, spring 116, and balls 125 all function in the same manner as their counterparts in Figs. 1 to 4. Plug member 115 is provided with a radius 132 which serves the same purpose as radius 32 in Figs. 1 to 4. One of the advantages of the alternative form of the invention is that member 115, which is also a nut for retaining propeller 112 on propeller shaft 111, is the only part of the release assembly which remains on the torpedo after release. As will be apparent, by comparing Figs. 4 and 4A, there is considerably less mass and volume remaining on the propeller shaft after release in the alternative construction which improves propeller propulsion efficiency to some extent.

Obviously many modifications and variations of the present invention are possible in the light of the above teachings. It is therefore to be understood that within the scope of the appended claims the invention may be practiced otherwise than as specifically described.

What is claimed is:

1. Apparatus for releasably securing a trailing stabilizer to a propeller shaft disposed at the rear end of an aerial launched torpedo, comprising; a first member adapted to be secured to the rear end of the torpedo propeller shaft, a second member adapted to be secured to an anti-friction bearing carried by the stabilizer, one of said members being tubular and the other member being disposed within the bore of same for axial movement within the bore upon separation of the members, an inertia weight sleeve disposed around both members adapted to move forwardly relative to the members, a spring urging the sleeve rearwardly to a locking position, a plurality of angularly spaced apertures disposed in the same plane and extending through the wall of the tubular member, an annular groove or the like in the other into which a portion of each ball is adapted to extend, the balls when in the position aforesaid abutting the bore of the sleeve and preventing axial movement of the members, the sleeve having an annular groove disposed rearwardly of the plane of the balls into which a portion of each ball may move when the sleeve moves relatively forwardly to a release position, and a spring urging the members away from each other.

2. Apparatus in accordance with claim 1 wherein the sleeve member is adapted to be affixed to the propeller shaft, and the other member is adapted to be affixed to the anti-friction bearing.

3. Apparatus in accordance with claim 1 wherein the sleeve member is adapted to be affixed to the anti-friction bearing, and the other member is adapted to be affixed to the propeller shaft.

4. Apparatus in accordance with claim 3 wherein said other member is a threaded nut adapted to retain a propeller on the propeller shaft.

5. Apparatus for releasably securing a trailing stabilizer to a propeller shaft disposed at the rear end of an aerial launched torpedo, comprising; a first member adapted to be secured at its front end to the rear end of the propeller shaft, said member having a tubular portion with a rearwardly open bore, a second member disposed within the bore and movable rearwardly out of same, an inertia weight sleeve disposed around the tubular portion adapted to move relatively forwardly therealong, a spring urging the sleeve rearwardly to a locking position, a plurality of angularly spaced apertures disposed in the same plane and extending through the wall of the tubular portion, a ball disposed in each aperture, an annular groove or the like in the second member into which a portion of each ball is adapted to extend, the balls when in the positions aforesaid abutting the bore of the sleeve and preventing movement of the second member out of the first named bore, said sleeve having an annular groove disposed rearwardly of the plane of the balls into which a portion of each ball may move when the sleeve moves relatively forwardly along the first member to a release position, means for preventing relative rotation between the first and second members, and an anti-friction bearing carried by the second member and the stabilizer, adapted to prevent rotation of the stabilizer about the axis of the propeller shaft.

References Cited in the file of this patent

UNITED STATES PATENTS

| | | |
|---|---|---|
| 2,435,444 | Johnsen | Feb. 3, 1948 |
| 2,565,470 | Brown | Aug. 28, 1951 |
| 2,723,876 | Langlois et al. | Nov. 15, 1955 |
| 2,778,308 | Fogel et al. | Jan. 22, 1957 |

FOREIGN PATENTS

| | | |
|---|---|---|
| 435,934 | Italy | May 28, 1948 |
| 979,155 | France | Dec. 6, 1950 |